(12) United States Patent
Mio et al.

(10) Patent No.: US 10,090,115 B2
(45) Date of Patent: Oct. 2, 2018

(54) ENERGY STORAGE DEVICE AND METHOD FOR PRODUCING ENERGY STORAGE DEVICE INCLUDING A PRE-DOPING TARGETED ELECTRODE

(71) Applicant: JTEKT CORPORATION, Osaka-shi (JP)

(72) Inventors: Takumi Mio, Kariya (JP); Takashi Matsuura, Konan (JP); Naoki Ohmi, Chiryu (JP); Takafumi Fujii, Okazaki (JP)

(73) Assignee: JTEKT CORPORATION, Osaka-shi (JP)

( * ) Notice: Subject to any disclaimer, the term of this patent is extended or adjusted under 35 U.S.C. 154(b) by 10 days.

(21) Appl. No.: 15/357,542

(22) Filed: Nov. 21, 2016

(65) Prior Publication Data
US 2017/0154736 A1  Jun. 1, 2017

(30) Foreign Application Priority Data
Nov. 26, 2015  (JP) .................. 2015-230455

(51) Int. Cl.
*H01G 11/50* (2013.01)
*H01G 11/06* (2013.01)
(Continued)

(52) U.S. Cl.
CPC ............. *H01G 11/50* (2013.01); *H01G 11/06* (2013.01); *H01G 11/12* (2013.01); *H01G 11/14* (2013.01);
(Continued)

(58) Field of Classification Search
CPC ........ H01G 11/84; H01G 11/86; H01G 11/50; H01G 11/06; H01G 11/12; H01G 11/74; H01G 11/76; H01G 11/24; H01G 11/26
See application file for complete search history.

(56) References Cited

U.S. PATENT DOCUMENTS

2005/0122664 A1* 6/2005 Takahashi ............. H01G 9/016
361/530
2009/0197171 A1* 8/2009 Nakazato ............... H01G 9/016
429/209
(Continued)

FOREIGN PATENT DOCUMENTS

JP  2011-192888  9/2011

*Primary Examiner* — Scott B Geyer
(74) *Attorney, Agent, or Firm* — Oblon, McClelland, Maier & Neustadt, L.L.P.

(57) ABSTRACT

An energy storage device before pre-doping includes positive electrodes, negative electrodes, separators, a cover, an electrolyte solution, a positive terminal, a negative terminal, and pre-doping metal foil. Each of the positive electrodes and the negative electrodes respectively include: positive collector foil and negative collector foil each having holes; and a positive active-material layer and a negative active-material layer arranged on at least one side of the collector foil. Either one or both of the positive electrodes and the negative electrodes include a pre-doping-targeted electrode, in which the pre-doping metal foil is arranged in direct contact with the surface of the active-material layer, and a non-arrangement part, in which the pre-doping metal foil is not arranged, is formed in at least part of the outer periphery of the active-material layer.

2 Claims, 10 Drawing Sheets

(51) Int. Cl.
*H01G 11/26* (2013.01)
*H01G 11/52* (2013.01)
*H01G 11/74* (2013.01)
*H01G 11/12* (2013.01)
*H01G 11/14* (2013.01)
*H01G 11/76* (2013.01)

(52) U.S. Cl.
CPC .............. *H01G 11/26* (2013.01); *H01G 11/52* (2013.01); *H01G 11/74* (2013.01); *H01G 11/76* (2013.01); *Y02E 60/13* (2013.01)

(56) References Cited

U.S. PATENT DOCUMENTS

| | | | |
|---|---|---|---|
| 2011/0236755 A1* | 9/2011 | Ogino | H01G 11/28 |
| | | | 429/218.1 |
| 2012/0003530 A1* | 1/2012 | Kuriki | H01G 11/06 |
| | | | 429/211 |
| 2012/0050953 A1* | 3/2012 | Lee | H01G 11/06 |
| | | | 361/528 |
| 2012/0063059 A1* | 3/2012 | Ra | H01G 11/06 |
| | | | 361/502 |

* cited by examiner

ENERGY STORAGE DEVICE AND METHOD FOR PRODUCING ENERGY STORAGE DEVICE INCLUDING A PRE-DOPING TARGETED ELECTRODE

INCORPORATION BY REFERENCE

The disclosure of Japanese Patent Application No. 2015-230455 filed on Nov. 26, 2015 including the specification, drawings and abstract, is incorporated herein by reference in its entirety.

BACKGROUND OF THE INVENTION

1. Field of the Invention

The invention relates to energy storage devices and methods for producing energy storage devices.

2. Description of the Related Art

Lithium-ion capacitors are known as energy storage devices. Such lithium-ion capacitors have a combined structure of a negative electrode of a lithium-ion cell and a positive electrode of an electric double-layer capacitor. Japanese Patent Application Publication No. 2011-192888 (JP 2011-192888 A) discloses a lithium-ion capacitor that has: a stack including positive electrodes, negative electrodes, lithium electrodes, and separators; an electrolyte solution; and a laminate outer package. The lithium electrodes are formed into a sheet shape in which lithium foil is crimped onto a lithium-electrode collector made of stainless steel.

JP 2011-192888 A discloses that the laminate outer package containing the stack is injected with the electrolyte solution to be sealed and left for a predetermined time, so that lithium foil dissolves into lithium ions and these lithium ions are pre-doped into the negative electrodes through the electrolyte solution.

In JP 2011-192888 A above, lithium-electrode collectors remain in the interior of the laminate outer package after the pre-doping causes the lithium foil to dissolve. However, the lithium-electrode collectors are unnecessary for the pre-doped energy storage device and it is desirable in terms of cost that unnecessary parts for a finished energy storage device are omitted.

SUMMARY OF THE INVENTION

It is an object of the present invention to provide an energy storage device that can reduce parts cost and a method for producing such an energy storage device.

An energy storage device according to one aspect of the invention is an energy storage device before pre-doping. The energy storage device includes: a plurality of positive electrodes and a plurality of negative electrodes, which are stacked alternately; a plurality of separators interposed between each of the positive electrodes and each of the negative electrodes; a cover containing the positive electrodes, the negative electrodes, and the separators; a positive terminal that is coupled to the positive electrodes and a part of which is arranged outside the cover; a negative terminal that is coupled to the negative electrodes and a part of which is arranged outside the cover; and a pre-doping metal foil arranged inside the cover. Each of the positive electrodes and each of the negative electrodes include collector foil having a hole and an active-material layer arranged on at least one side of the collector foil; either one or both of the positive electrodes and the negative electrodes include a pre-doping-targeted electrode in which the pre-doping metal foil is arranged in direct contact with a surface of the active-material layer; and in the pre-doping-targeted electrode, a non-arrangement part in which the pre-doping metal foil is not arranged is formed in at least part of the outer periphery of the active-material layer.

In the energy storage device before pre-doping according to the aspect, the pre-doping metal foil is arranged in direct contact with the surface of the active-material layer of the positive electrode or the negative electrode. This can omit collectors used in arranging the pre-doping metal foil in the related art and thus can reduce parts cost.

The pre-doping-targeted electrode includes the non-arrangement part in which the pre-doping metal foil is not arranged, in at least part of the outer periphery of the active-material layer. In the outer periphery of the active-material layer, lack of the active-material layer may occur. In particular, when the pre-doping metal foil is arranged in direct contact with the surface of the active-material layer, the arrangement of the pre-doping metal foil may cause lack of the outer periphery of the active-material layer. If the lack of the active-material layer occurs in the part where the pre-doping metal foil is arranged, a short circuit due to a contact between the pre-doping metal foil and the collector foil may occur.

In contrast, in the energy storage device before pre-doping according to the aspect, the pre-doping metal foil is not arranged on the whole outer periphery of the active-material layer in the pre-doping-targeted electrode. That is, the pre-doping metal foil is arranged in such a manner as to avoid the part where the lack of the active-material layer may occur. This inhibits the lack of the active-material layer in the part where the pre-doping metal foil is arranged in the case where the pre-doping metal foil is arranged in direct contact with the surface of the active-material layer. As a result, this can prevent the occurrence of a short circuit due to a contact between the pre-doping metal foil and the collector foil. Furthermore, this can inhibit the production of a defective energy storage device that has a lacking part of the active-material layer between the pre-doping metal foil and the collector foil and thus can reduce production cost.

A production method according to another aspect of the invention is a method for producing an energy storage device. The energy storage device produced by the production method according to the aspect includes: a plurality of positive electrodes and a plurality of negative electrodes that are stacked alternately; a plurality of separators interposed between each of the positive electrodes and each of the negative electrodes; a cover containing the positive electrodes, the negative electrodes, and the separators; an electrolyte solution arranged inside the cover; a positive terminal that is coupled to the positive electrodes and a part of which is arranged outside the cover; and a negative terminal that is coupled to the negative electrodes and a part of which is arranged outside the cover. Each of the positive electrodes and each of the negative electrodes include collector foil having a hole and an active-material layer arranged on at least one side of the collector foil.

The production method according to the aspect includes forming a pre-doping-targeted electrode in which pre-doping metal foil is arranged in direct contact with the surface of the active-material layer and a non-arrangement part in which the pre-doping metal foil is not arranged is formed in at least part of the outer periphery of the active-material layer, in at least one of the positive electrodes or at least one of the negative electrodes; stacking the pre-doping-targeted electrode, the positive electrodes, the negative electrodes, and the separators to couple the positive terminal to the positive electrodes and couple the negative terminal to the negative electrodes; containing the stacked pre-doping-targeted electrode, positive electrodes, negative electrodes, and separators in the cover; and injecting the electrolyte solution into the cover to pre-dope lithium ions into the negative electrodes with the pre-doping metal foil.

In the method for producing the energy storage device according to the aspect, the pre-doping metal foil is arranged in direct contact with the surface of the active-material layer of the positive electrode or the negative electrode, in the pre-doping-targeted electrode. This can omit collectors used in arranging the pre-doping metal foil in the related art and thus can reduce parts cost.

In the pre-doping-targeted electrode, a non-arrangement part in which the pre-doping metal foil is not arranged is formed in at least part of the outer periphery of the active-material layer. That is, the pre-doping metal foil is arranged in such a manner as to avoid the part where the lack of the active-material layer may occur. This inhibits the lack of the active-material layer in the part where the pre-doping metal foil is arranged in the case where the pre-doping metal foil is arranged in direct contact with the surface of the active-material layer. As a result, this can prevent the occurrence of a short circuit due to a contact between the pre-doping metal foil and the collector foil. Furthermore, this can inhibit the production of a defective energy storage device that has a lacking part of the active-material layer between the pre-doping metal foil and the collector foil and thus can reduce production cost.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1A:
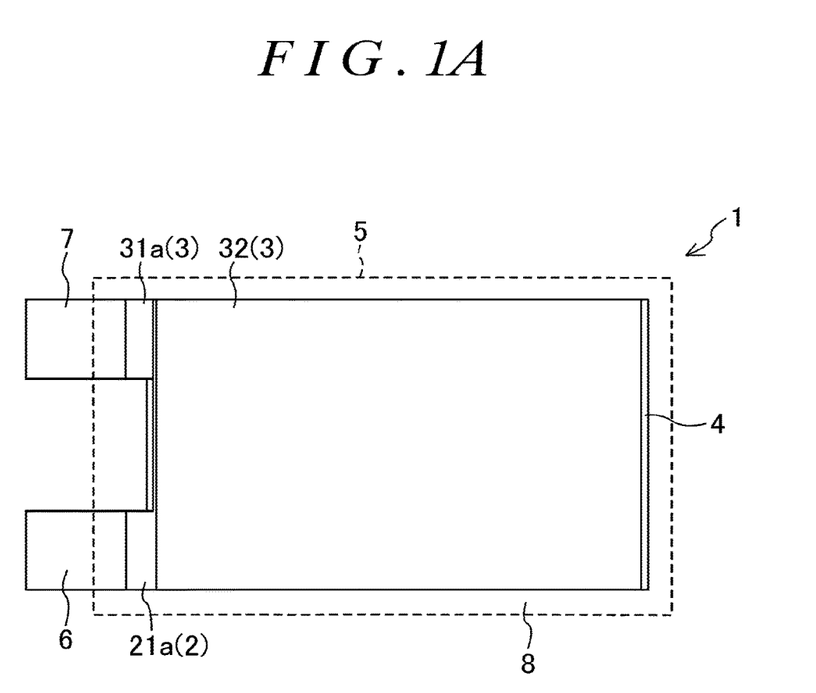
FIG. 1A is a top view of the interior of a cover of a finished energy storage device in one embodiment of the present invention and illustrates the cover in dashed lines.
Figure 1B:
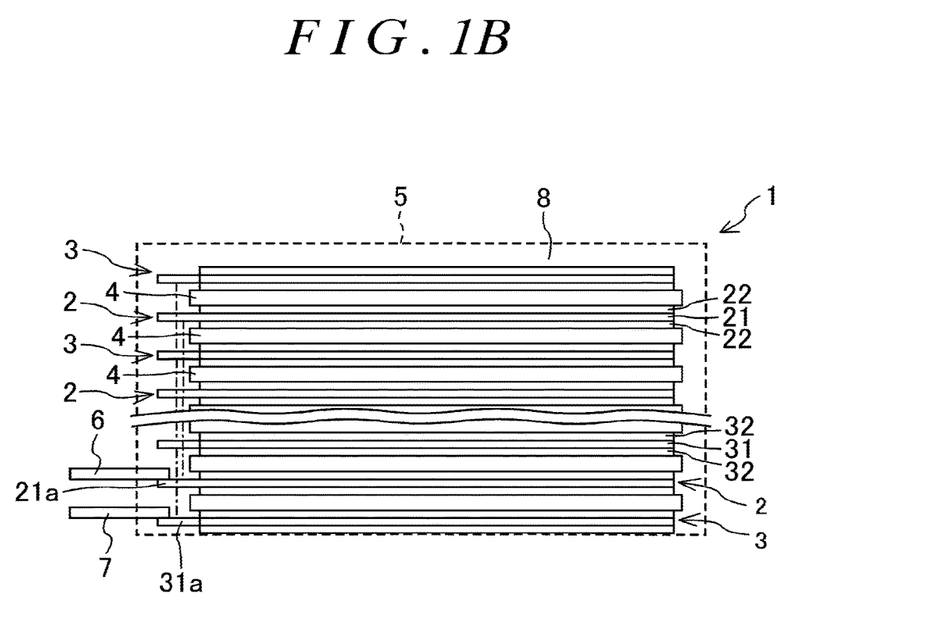
FIG. 1B is a side view of the interior of the cover of the finished energy storage device and illustrates the cover in dashed lines.

With reference to the drawings, embodiments to which the present invention is applied will now be described. First, with reference to FIGS. 1A and 1B, a finished energy storage device 1 in one embodiment of the present invention will be described. As illustrated in FIGS. 1A and 1B, the finished energy storage device 1 is a lithium-ion capacitor having a plurality of positive electrodes 2, a plurality of negative electrodes 3, a plurality of separators 4, a cover 5, a positive terminal 6, a negative terminal 7, and an electrolyte solution 8. The negative electrodes 3 have pre-doped lithium ions.

The positive electrodes 2 and the negative electrodes 3 are a sheet-shaped electrode and are stacked alternately one by one. The separators 4 are a sheet-shaped insulator and interposed between each positive electrode 2 and each negative electrode 3, which are stacked alternately. Exemplary materials used for the separators 4 include prepared paper made of such as viscose rayon and natural cellulose, and nonwoven fabric made of such as polyethylene and polypropylene.

The cover 5 is a bag-shaped member containing the stacked positive electrodes 2, negative electrodes 3, and separators 4, and is made of a plastic film. The positive terminal 6 is a terminal electrically coupled to the positive electrodes 2, and the negative terminal 7 is a terminal electrically coupled to the negative electrodes 3. The positive terminal 6 and the negative terminal 7 are made of a metal plate, and the cover 5 is sealed with a part of the positive terminal 6 and a part of the negative terminal 7 exposed outside the cover 5.

The electrolyte solution 8 is a non-aqueous solution in which lithium salt is an electrolyte, and is injected into the interior of the cover 5. The electrolyte solution 8 uses gamma butyl lactone, propylene carbonate, and other materials as a main solvent and uses carbonates, such as ethylene carbonate, as a secondary solvent. The lithium salt includes $LiPF_6$ and $LiBF_4$.

Figure 2:
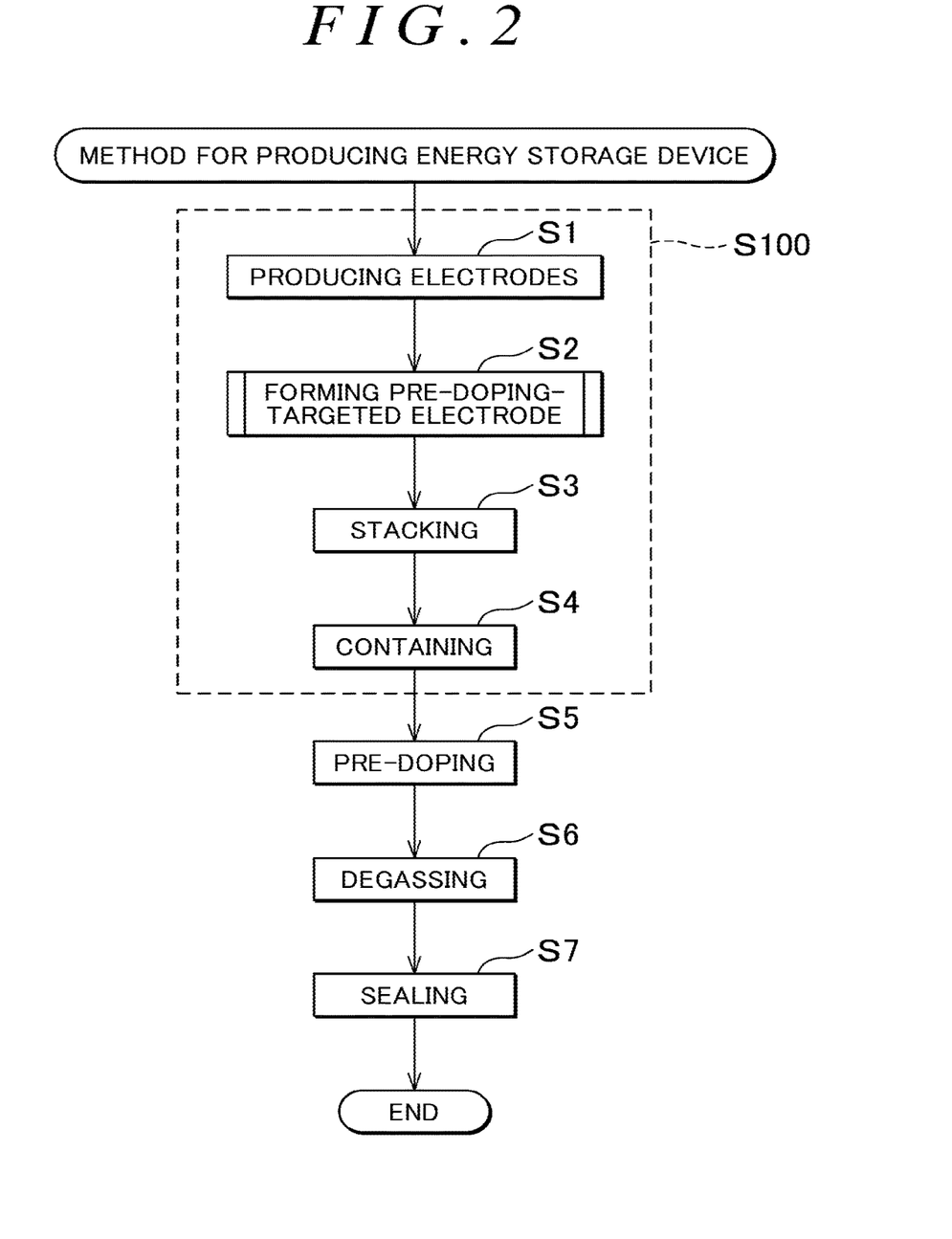
FIG. 2 is a flowchart illustrating a method for producing the finished energy storage device.

A process of producing the energy storage device 1 will now be described. As illustrated in FIG. 2, the process of producing the energy storage device 1 includes producing electrodes (S1), forming a pre-doping-targeted electrode (S2), stacking (S3), containing (S4), pre-doping (S5), degassing (S6), and sealing (S7). A process of producing the energy storage device 100 before pre-doping (S100) is from the producing (Si) to the containing (S4).

First, a method for producing the energy storage device 100 before pre-doping (S100) will be described, with reference to FIGS. 2 to 5.

The producing (S1) is a step that produces multiple positive electrodes 2 and multiple negative electrode materials 30, which serve as a material of the negative electrode 3. The negative electrode material 30 refers to the negative electrode 3 (see FIG. 1A) before pre-doping of lithium ions and has the same structure as the negative electrode 3 except that lithium ions are not pre-doped.

Figure 3A:
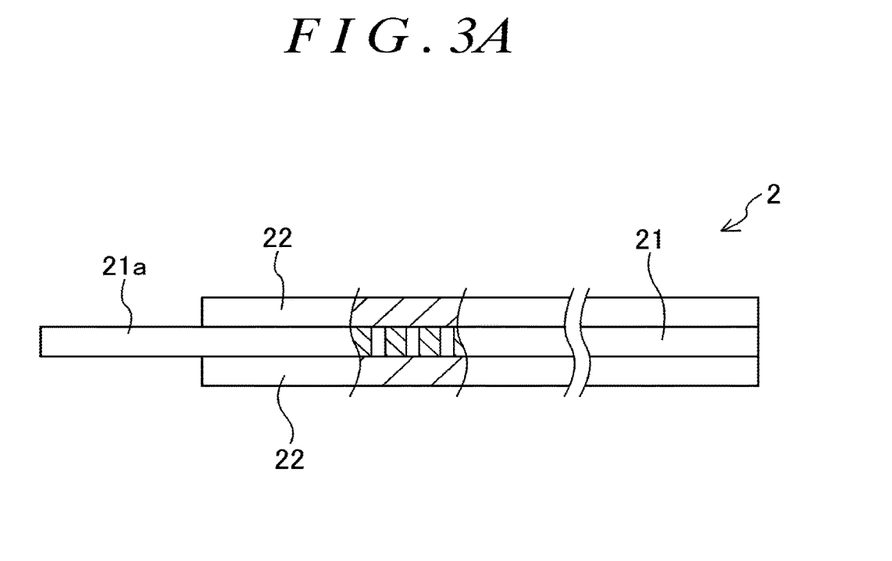
FIG. 3A is a side view of a positive electrode, and a part of the positive electrode is viewed in cross section.

As illustrated in FIG. 3A, the positive electrode 2 includes positive collector foil 21 and a positive active-material layer 22. The positive collector foil 21 is made of metal foil having a plurality of holes, and the positive active-material layer 22 is arranged on one side or both sides of the positive collector foil 21. In the present embodiment, the positive active-material layer 22 is arranged on both sides of the positive collector foil 21.

The positive collector foil 21 may include foil made of aluminum, stainless steel, copper, nickel, or other metals. The positive collector foil 21 has a positive extension part 21a, which is extended from one end side in a longitudinal direction (the left side in FIG. 3A) along the longitudinal direction. The length dimension in a width direction of the positive extension part 21a (the length dimension in a direction perpendicular to the paper surface of FIG. 3A, the length dimension in an up-and-down direction in FIG. 1A) is smaller than the length dimension in a width direction of the positive collector foil 21 at the other end side in the longitudinal direction (the right side in FIG. 3A) of the positive collector foil 21, and the positive extension part 21a is arranged at a position biased to the one side in the width direction of the positive collector foil 21 (the front side of the paper surface of FIG. 3A, the down side in FIG. 1A).

The positive active-material layer 22 is produced by suspending a positive electrode mixture in which various additive materials, such as a conductive assistant material, a binder, and a thickener, are appropriately added to a positive material in an appropriate solvent to mix it to make slurry, applying the slurry to the positive collector foil 21, and drying and pressing it. The positive material may include active carbon and polyacene, but is not limited to them. The conductive assistant material may include ketjen black and acetylene black; the binder may include polyvinylidene fluoride, SBR rubber, and polyacrylic acid; the thickener may include carboxymethyl cellulose; and the solvent may include organic solvents, such as N-methyl pyrrolidone, or water. The positive active-material layer 22 is arranged on the part except the positive extension part 21a in a rectangular foil shape.

Figure 3B:
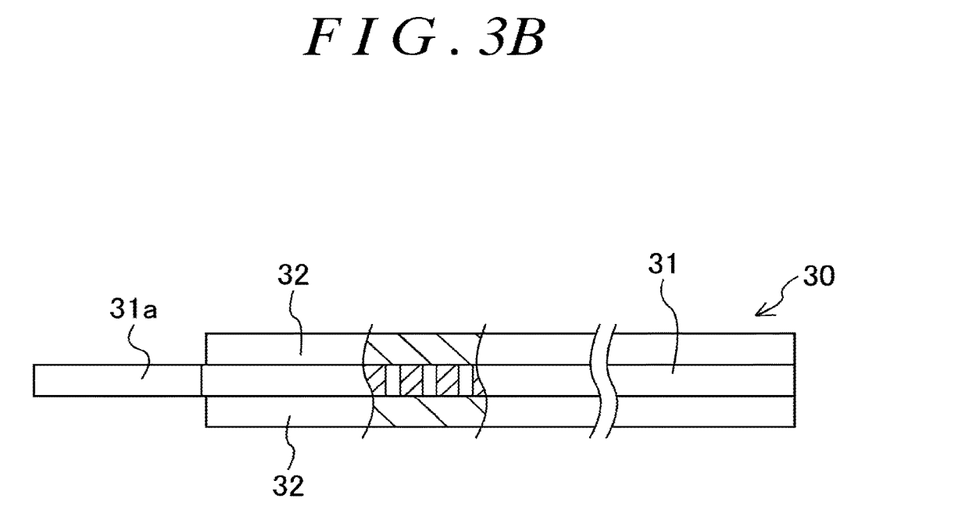
FIG. 3B is a side view of a negative electrode material, and a part of the negative electrode material is viewed in cross section.

As illustrated in FIG. 3B, the negative electrode material 30 includes negative collector foil 31 and a negative active-material layer 32. The negative collector foil 31 is made of metal foil having a plurality of holes, and the negative active-material layer 32 is arranged on one side or both sides of the negative collector foil 31. In the present embodiment, the negative active-material layer 32 is arranged on both sides of the negative collector foil 31.

The negative collector foil 31 may include foil made of copper, stainless steel, or other metals. The negative collector foil 31 has a negative extension part 31a, which is extended from one end side in a longitudinal direction (the left side in FIG. 3B) along the longitudinal direction. The length dimension in a width direction of the negative extension part 31a (the length dimension in a direction perpendicular to the paper surface of FIG. 3B, the length dimension in the up-and-down direction in FIG. 1A) is smaller than the length dimension in a width direction of the negative collector foil 31 at the other end side in the longitudinal direction (the right side in FIG. 3B) of the negative collector foil 31, and the negative extension part 31a is arranged at a position biased to the other side in the width direction of the negative collector foil 31 (the back side of the paper surface of FIG. 3B, the upper side in FIG. 1A).

In the same manner as the positive active-material layer 22, the negative active-material layer 32 is produced by applying, to the negative collector foil 31, slurry of a negative mixture in which additive materials are appropriately added to a negative material, and drying and pressing it. The negative material may include carbonaceous materials, such as black lead (graphite) that can sorb and desorb lithium ions reversibly. The same materials as in the case of the positive active-material layer 22 may be used as a conductive assistant material, a binder, a thickener, and a solvent in the negative active-material layer 32. The negative active-material layer 32 is arranged on the part except the negative extension part 31a in a rectangular foil shape.

In the producing (S1), the slurry containing the positive electrode material and the additive materials is applied to both sides of metal foil having a plurality of holes, and the slurry is dried. This produces the positive electrode 2 with the rectangular-foil-shaped, positive active-material layer 22 arranged on both sides of the positive collector foil 21. Similarly, the slurry containing the negative material and the additive materials is applied to both sides of metal foil having a plurality of holes, and the slurry is dried. This produces the negative electrode material 30 with the rectangular-foil-shaped, negative active-material layer 32 arranged on both sides of the negative collector foil 31.

Figure 3C:
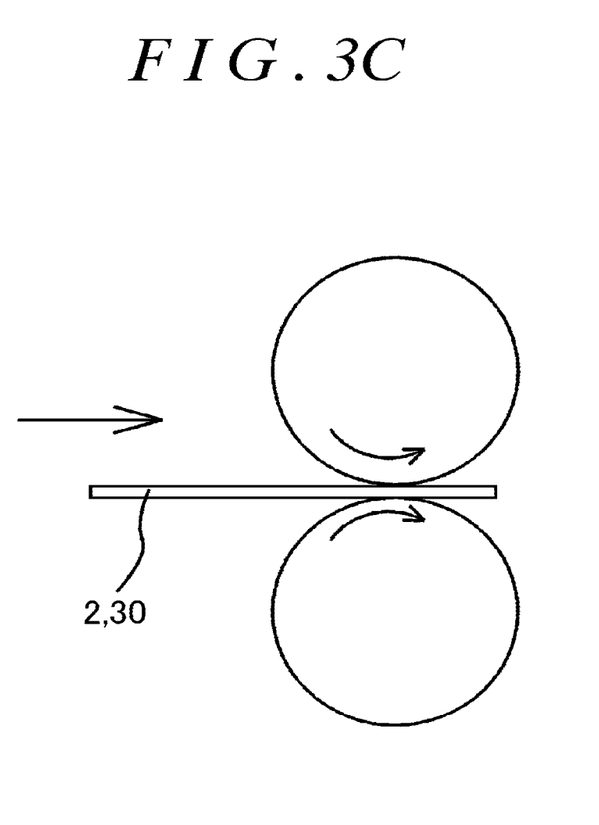
FIG. 3C is a diagram illustrating a state in which roll-press working is applied to the positive electrode or the negative electrode material.

As illustrated in FIG. 3C, press working with a roll press is then applied to the positive electrode 2 and the negative electrode material 30, which have the dried slurry, to evenly smooth the thickness dimensions of the positive active-material layer 22 and the negative active-material layer 32.

Figure 4A:
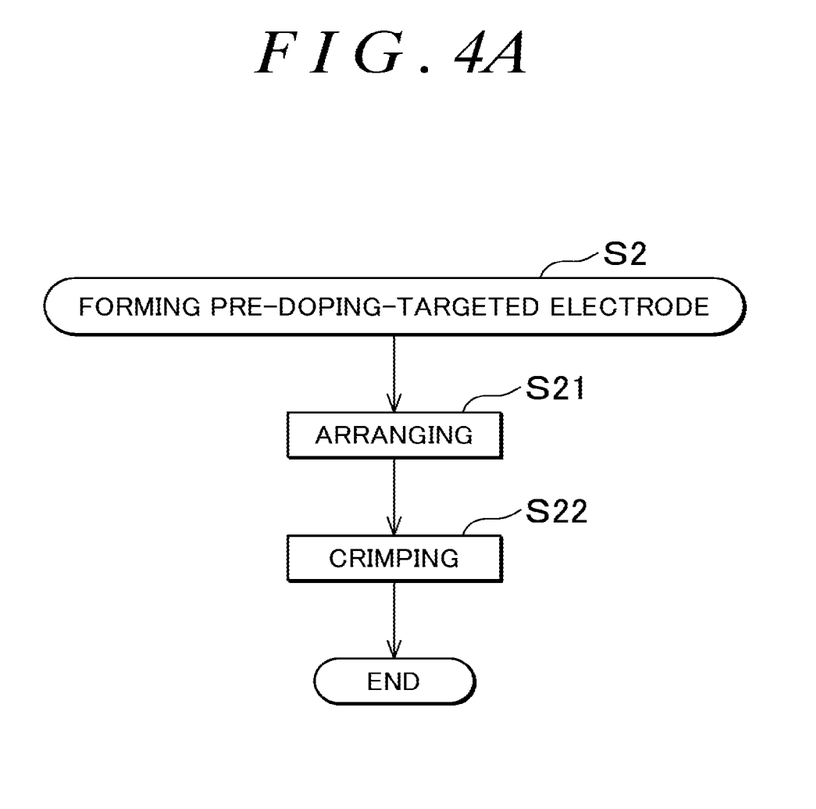
FIG. 4A is a flowchart illustrating forming a pre-doping-targeted electrode.
Figure 4B:
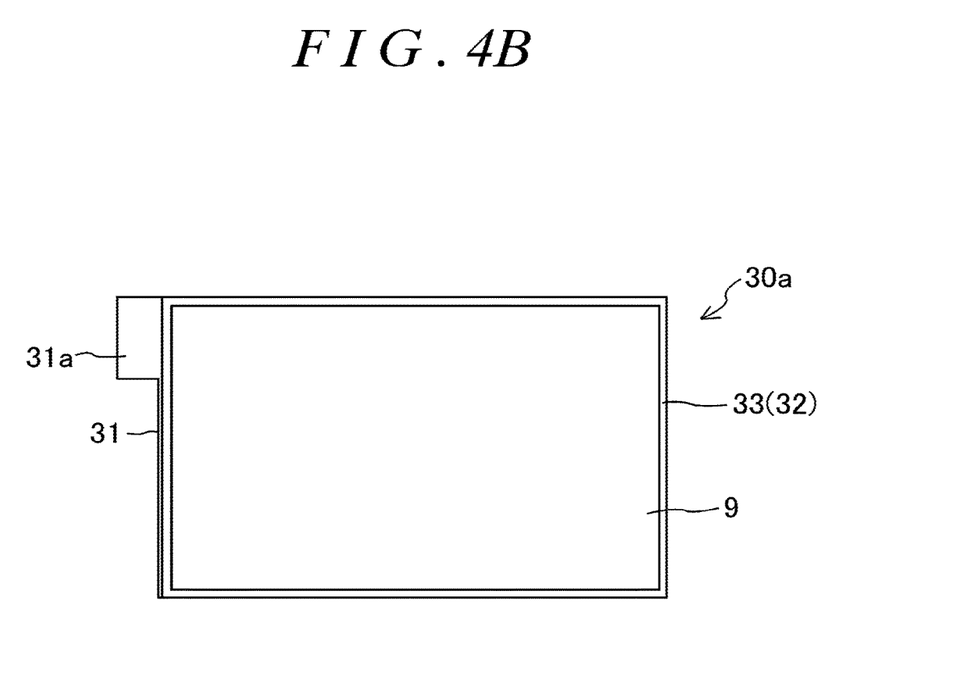
FIG. 4B is a top view of the pre-doping-targeted electrode.
Figure 4C:
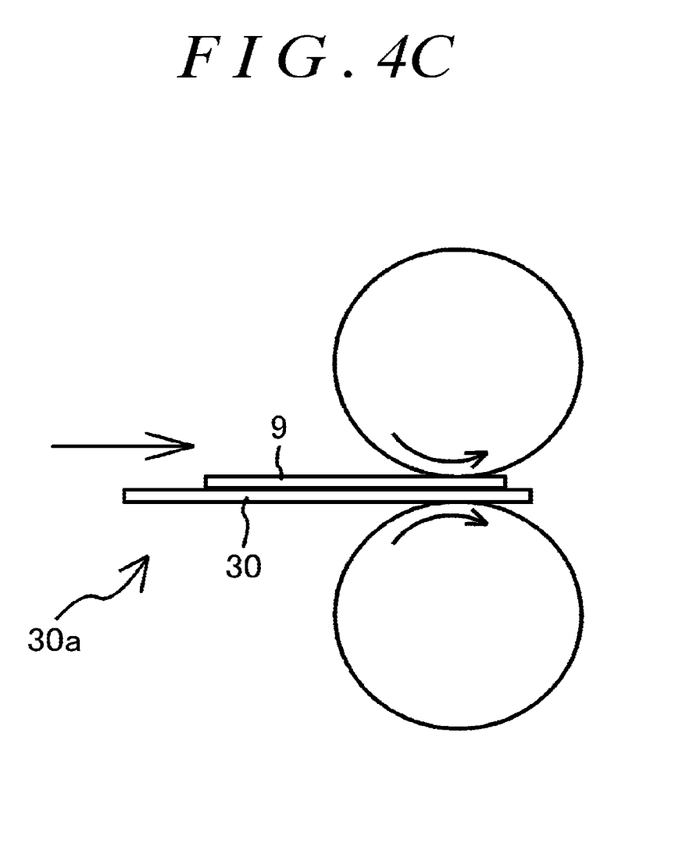
FIG. 4C is a diagram illustrating a state in which roll-press working is applied to the pre-doping-targeted electrode.

With reference to FIGS. 4A to 4C, the forming (S2) will now be described. In the forming (S2), pre-doping metal foil 9, which has a rectangular-foil shape and is made of a lithium metal, is crimped onto the negative electrode material 30 to form a pre-doping-targeted electrode 30a. The long-side dimension of the pre-doping metal foil 9 is smaller than that of the negative active-material layer 32, and the short-side dimension of the pre-doping metal foil 9 is smaller than that of the negative active-material layer 32 (see FIG. 4B).

As illustrated in FIG. 4A, the forming (S2) includes arranging (S21) and crimping (S22). The arranging (S21) is a step that arranges the pre-doping metal foil 9 on one negative electrode material 30 of multiple negative electrode materials 30, which are used for one finished energy storage device 1 (see FIG. 1A), and arranges the pre-doping metal foil 9 in direct contact with the surface of the negative active-material layer 32.

As illustrated in FIG. 4B, in the arranging (S21), the pre-doping metal foil 9 is arranged on a central portion of the part where the negative active-material layer 32 is arranged. This forms a non-arrangement part 33, in which the pre-doping metal foil 9 is not arranged, throughout the whole outer periphery of the negative active-material layer 32, in the negative active-material layer 32.

As illustrated in FIG. 4C, the crimping (S22) is a step that crimps the pre-doping metal foil 9 onto the surface of the negative active-material layer 32. In the crimping (S22), press working with a roll press is applied to the negative electrode material 30, in which the pre-doping metal foil 9 is arranged on the surface of the negative active-material layer 32 in the arranging (S21), to form a pre-doping-targeted electrode 30a.

In this manner, in the forming (S2), the pre-doping metal foil 9 is crimped in direct contact with the surface of the negative electrode material 30. In comparison with the case where the pre-doping metal foil 9 is crimped onto the pre-doping collector including a metal plate and is arranged on the surface of the negative electrode material 30 via the pre-doping collector, this configuration can omit such a pre-doping collector and thus can reduce parts cost.

The pre-doping metal foil 9 is rolled by applying the press working. In contrast, in the present embodiment, the non-arrangement part 33 is formed throughout the whole outer periphery of the negative active-material layer 32, in the state where the pre-doping metal foil 9 is arranged on the surface of the negative active-material layer 32 by the arranging (S21).

This can prevent the pre-doping metal foil 9, which is rolled by the press working in the crimping (S22), from extending beyond the part where the negative active-material layer 32 is arranged. This can avoid the occurrence of a defect that the pre-doping metal foil 9 extending beyond the part where the negative active-material layer 32 is arranged is in contact with the negative collector foil 31 and a short circuit occurs. Furthermore, the formation of a defective pre-doping-targeted electrode in which the pre-doping metal foil 9 extends beyond the part where the negative active-material layer 32 is arranged by the press working can be inhibited and thus production cost can be reduced.

The negative active-material layer 32 is formed into a foil shape by binding a powdered negative material with a binder. However, the binder contained in the negative active-material layer 32 is an insulator, and thus it is desirable to minimize the binder content of the negative active-material layer 32 constituting the negative electrode 3 (see FIG. 1A). For this reason, the binding strength of the negative material is set to be low in the negative active-material layer 32.

Accordingly, in applying the press working to the negative electrode material 30 in the producing (S1) and the crimping (S22), binding of the negative material is easily released and its lack easily occurs, in the outer periphery of the negative active-material layer 32 to which a large stress is applied in comparison with the remainder.

If the lack of the active-material layer occurs in the part where the pre-doping metal foil 9 is arranged, a short circuit due to a contact between the pre-doping metal foil 9 and the negative collector foil 31 may occur.

In contrast, in the pre-doping-targeted electrode 30*a*, the non-arrangement part 33 is formed in the outer periphery of the negative active-material layer 32, and the pre-doping metal foil 9 is not arranged on the whole outer periphery of the negative active-material layer 32 in the pre-doping-targeted electrode 30*a*. That is, the pre-doping metal foil 9 is arranged in such a manner as to avoid the part where the lack of the negative active-material layer 32 may occur. This inhibits the lack of the negative active-material layer 32 in the part where the pre-doping metal foil 9 is arranged in the case where the pre-doping metal foil 9 is arranged in direct contact with the surface of the negative active-material layer 32.

This can prevent the occurrence of a short circuit due to a contact between the pre-doping metal foil 9 and the negative collector foil 31. Furthermore, this can inhibit the production of the defective energy storage device 100, which has the lacking part of the negative active-material layer 32 between the pre-doping metal foil 9 and the negative collector foil 31, and thus can reduce production cost.

In the present embodiment, the producing (S1) and the forming (S2) are performed separately, but the forming (S2) may be performed simultaneously with the producing (S1). That is, in the producing (S1), the pre-doping metal foil 9 may be arranged on one negative electrode material 30 of the negative electrode materials 30 with dried slurry in direct contact with the surface of the negative active-material layer 32, as the arranging (S21), and then the crimping (S22) may be performed. This can perform the press working for evenly smoothing the thickness dimension of the negative active-material layer 32 in the producing (S1) simultaneously with the crimping (S22), and thus can reduce time required for the production of the pre-doping-targeted electrode 30*a*.

Figure 5:
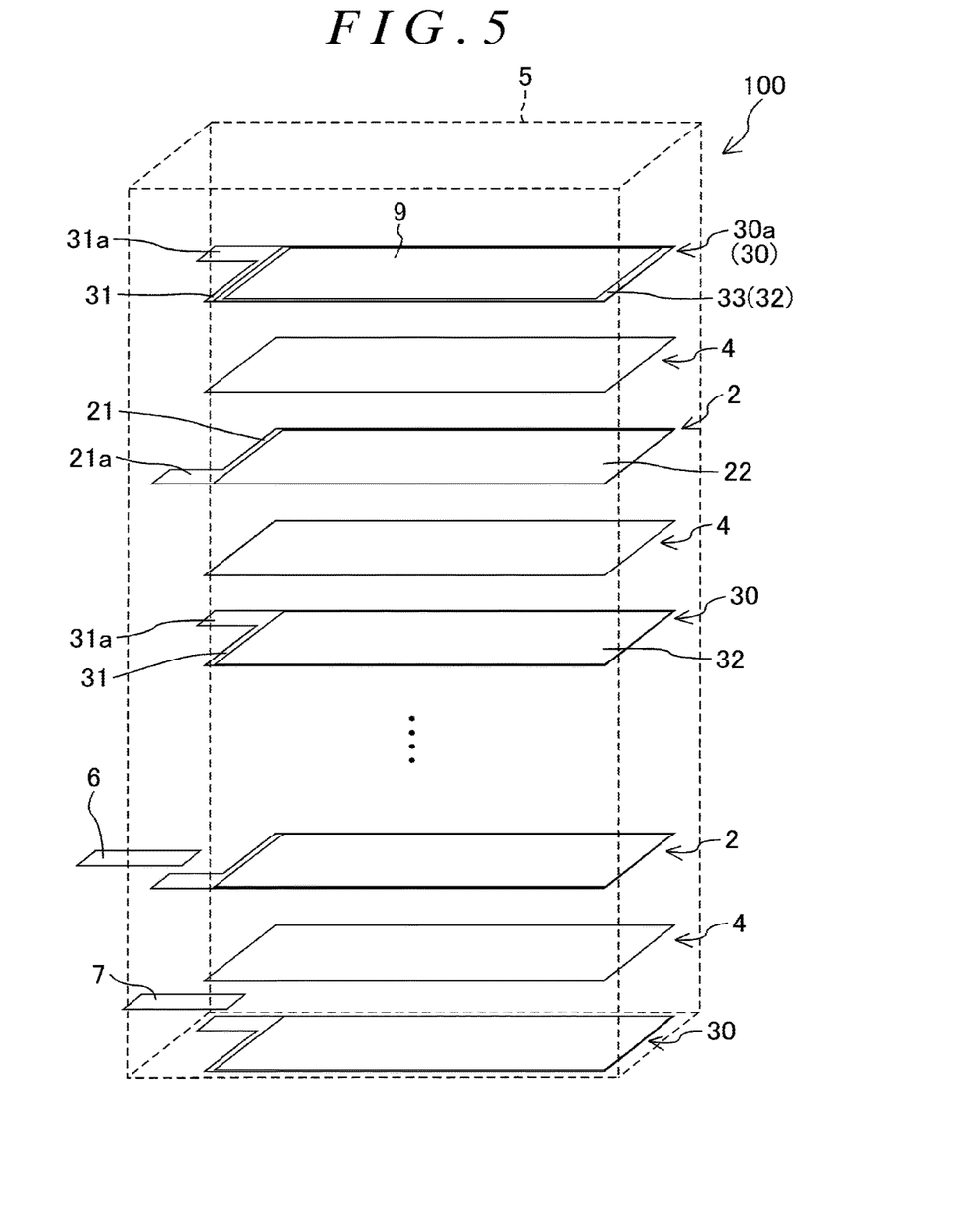
FIG. 5 is an exploded perspective view of the interior of the cover of the energy storage device before pre-doping and schematically illustrates the cover in dashed lines.

Next, the stacking (S3) will be described. As illustrated in FIG. 5, the stacking (S3) is a step that stacks the positive electrodes 2, the negative electrode materials 30, and the separators 4. First, in the stacking (S3), the positive electrodes 2 are interposed one by one between the negative electrode materials 30, which are stacked with the pre-doping-targeted electrode 30*a* arranged in the outermost layer. As a result, the negative electrode materials 30 and the positive electrodes 2 are stacked alternately one by one.

At this time, the stacked positive electrodes 2 are arranged at positions where the positive extension parts 21*a* are superposed in a stacked direction, and the stacked negative electrode materials 30 are arranged at positions where the negative extension parts 31*a* are overlapped in the stacked direction. Furthermore, the positive electrodes 2 and the negative electrode materials 30 are arranged at positions where the positive extension parts 21*a* and the negative extension parts 31*a* are not overlapped with each other in the stacked direction. In the stacking (S3), the positive electrodes 2 and the negative electrode materials 30 are arranged at positions where the respective positive active-material layers 22 and the respective negative active-material layers 32 are overlapped with the pre-doping metal foil 9, when viewed from the stacked direction.

The separators 4 are then interposed one by one between the negative electrode materials 30 and the positive electrodes 2, which are stacked alternately one by one. Then, the positive terminal 6 is electrically coupled to the positive extension parts 21*a* of the stacked positive electrodes 2 and the negative terminal 7 is electrically coupled to the negative extension parts 31*a* of the stacked negative electrode materials 30.

Returning to FIG. 2, the description on the method for producing the energy storage device 100 before pre-doping is continued. The containing (S4) contains the stacked positive electrodes 2, negative electrode materials 30, and separators 4 in the cover 5, with a part of the positive terminal 6 and a part of the negative terminal 7 exposed outside the cover 5. This completes the production of the energy storage device 100 before pre-doping.

The following describes the production process from performing pre-doping on the energy storage device 100 before pre-doping to producing the finished energy storage device 1, with reference to FIG. 2.

The pre-doping (S5) is a step that pre-dopes lithium ions into the negative electrode materials 30 of the energy storage device 100 before pre-doping. In the pre-doping (S5), the electrolyte solution 8 is injected into the cover 5 and the cover 5 is sealed once. As a result, pre-doping of lithium ions into the negative electrode materials 30 is started in the cover 5. That is, the pre-doping metal foil 9 dissolves in the electrolyte solution 8 into lithium ions and these lithium ions are pre-doped into the negative electrode materials 30 through the electrolyte solution 8. When a predetermined time period elapses, all the negative electrode materials 30 including the pre-doping-targeted electrode 30*a* turn into the negative electrodes 3 with lithium ions doped.

The positive collector foil 21 and the negative collector foil 31 each have a plurality of holes. Thus, in a part of the negative active-material layer 32, arranged at the position that overlaps with the pre-doping metal foil 9 when viewed from the stacked direction, the pre-doping is performed smoothly. In contrast, in a part of the negative active-material layer 32, arranged at the position that does not overlap with the pre-doping metal foil 9 when viewed from the stacked direction, much time is required for the pre-doping in comparison with the negative active-material layer 32 arranged at the position that overlaps with the pre-doping metal foil 9 when viewed from the stacked direction.

In this regard, in the energy storage device 1 before pre-doping, it is desirable that the projection area of the pre-doping metal foil 9 when the pre-doping-targeted electrode 30*a* is viewed from the stacked direction of the positive electrodes 2 and the negative electrode materials 30 is equal to or greater than 80% and less than 100% of the projection area of the whole part where the negative active-material layer 32 is arranged. In the present embodiment, the projection area of the pre-doping metal foil 9 is approximately 90% of the projection area of the whole part where the negative active-material layer 32 is arranged. This causes the negative active-material layer 32 to be arranged at the position widely overlapping with the pre-doping metal foil 9 when viewed from the stacked direction of the positive electrodes 2 and the negative electrode materials 30, and thus can reduce time required for the pre-doping of lithium ions.

In contrast, in the pre-doping-targeted electrode 30a, the projection area of the pre-doping metal foil 9 viewed from the stacked direction is less than 100% of the whole negative active-material layer 32 viewed from the stacked direction, and the non-arrangement part 33, in which the pre-doping metal foil 9 is not arranged, is formed in the outer periphery of the negative active-material layer 32. This can inhibit the occurrence of a lacking part of the negative active-material layer 32 between the pre-doping metal foil 9 and the negative collector foil 31 in the case of lack of the outer periphery of the negative active-material layer 32.

After the pre-doping (S5) has finished, the process moves to the degassing (S6). In the degassing (S6), a charging operation is performed on the positive electrodes 2 and the negative electrodes 3 and gas generated in the cover 5 with the charging is released outside the cover 5. Finally, the cover 5 is sealed in the sealing (S7). This finishes the process of producing the finished energy storage device 1.

As described above, in the method for producing the energy storage device 1 in the present embodiment, the pre-doping metal foil 9 is arranged in direct contact with the surface of the negative active-material layer 32 of the negative electrode material 30. This can omit a collector for pre-doping used in arranging the pre-doping metal foil 9 in the related art and thus can reduce parts cost.

Although the present invention has been described based on the embodiments, the invention is not limited to the embodiments, and various modifications can be made without departing from the spirit of the invention.

For example, the present embodiment has described the case where the pre-doping metal foil 9 is arranged on one side of the pre-doping-targeted electrode 30a, but the pre-doping metal foil 9 may be arranged on both sides of one pre-doping-targeted electrode 30a. The present embodiment has described the case where the pre-doping-targeted electrode 30a is arranged in the outermost layer of the stacked negative electrode materials 30 in stacking the negative electrode materials 30 in the arranging (S21), but the pre-doping-targeted electrode 30a may be arranged between the stacked negative electrode materials 30.

Furthermore, the present embodiment has described the case where one pre-doping-targeted electrode 30a is arranged in one energy storage device 100 before pre-doping, but multiple pre-doping-targeted electrodes 30a may be arranged. For example, when one energy storage device 100 before pre-doping has two pre-doping-targeted electrodes 30a, and the negative electrode materials 30 are stacked in the arranging (S21), the two pre-doping-targeted electrodes 30a may be arranged in the respective outermost layers, and between the two pre-doping-targeted electrodes 30a, the remaining negative electrode materials 30 except those pre-doping-targeted electrodes 30a may be arranged.

The present embodiment has described the case where the pre-doping metal foil 9 is arranged on the surface of the negative active-material layer 32 of the negative electrode material 30, but the pre-doping metal foil 9 may be arranged on the surface of the positive active-material layer 22 of the positive electrode 2. The present embodiment has described the case where the negative electrode material 30 is arranged in the outermost layer in the stacking (S3), but the positive electrode 2 may be arranged in the outermost layer.

In the embodiment, a roll press is used in applying the press working to the dried positive active-material layer 22 and negative active-material layer 32 in the producing (S1), but the press working may be applied with a press except roll presses.

The embodiment has described the case where in the pre-doping-targeted electrode 30a, the pre-doping metal foil 9 is arranged on a central portion of the part where the negative active-material layer 32 is arranged, and the non-arrangement part 33 is formed in the whole outer periphery of the negative active-material layer 32, but in the part where the negative active-material layer 32 is arranged, the negative active-material layer 32 and the pre-doping metal foil 9 may be arranged in a state where their one ends are aligned. In this case, using the part where the negative active-material layer 32 and the pre-doping metal foil 9 are arranged in the state where their one ends are aligned as an initial point of the press working with a roll press can prevent the pre-doping metal foil 9 from extending beyond the part where the negative active-material layer 32 is arranged.

The present embodiment has described the case where the finished energy storage device 1 is a lithium-ion capacitor and the pre-doping metal foil 9 is made of lithium, but the pre-doping metal foil 9 may be made of alkali metals except lithium. Such alkali metals except lithium include sodium, potassium, rubidium, and cesium.

The energy storage device 100 before pre-doping in the embodiment includes: the positive electrodes 2 and the negative electrodes 3 (negative electrode materials 30), which are stacked alternately; the separators 4, which are interposed between each of the positive electrodes 2 and each of the negative electrodes 3; the cover 5, which contains the positive electrodes 2, the negative electrodes 3, and the separators 4; the positive terminal 6, which is coupled to the positive electrodes 2 and a part of which is arranged outside the cover 5; the negative terminal 7, which is coupled to the negative electrodes 3 and a part of which is arranged outside the cover 5; and the pre-doping metal foil 9, which is arranged inside the cover 5. Each of the positive electrodes 2 includes the positive collector foil 21 as collector foil having holes and the positive active-material layer 22 as an active-material layer arranged on at least one side of the collector foil, and each of the negative electrodes 3 includes the negative collector foil 31 as collector foil having holes and the negative active-material layer 32 as an active-material layer arranged on at least one side of the collector foil.

In addition, in the energy storage device 100 before pre-doping, either one or both of the positive electrodes 2 and the negative electrodes 3 include the pre-doping-targeted electrode 30a, in which the pre-doping metal foil 9 is arranged in direct contact with the surface of the active-material layer, and in the pre-doping-targeted electrode 30a, the non-arrangement part 33, in which the pre-doping metal foil 9 is not arranged, is formed in at least part of the outer periphery of the active-material layer.

In the energy storage device 100 before pre-doping, the pre-doping metal foil 9 is arranged in direct contact with the surface of the positive active-material layer 22 or the negative active-material layer 32 as the active-material layer of the positive electrode 2 or the negative electrode 3 (the negative electrode material 30). This can omit a collector used in arranging the pre-doping metal foil 9 in the related art and thus can reduce parts cost.

The pre-doping-targeted electrode 30*a* includes the non-arrangement part 33, in which the pre-doping metal foil 9 is not arranged, in at least part of the outer periphery of the active-material layer. In the outer periphery of the active-material layer, lack of the active-material layer may occur. In particular, when the pre-doping metal foil 9 is arranged in direct contact with the surface of the active-material layer, the arrangement of the pre-doping metal foil 9 may cause lack of the outer periphery of the active-material layer. If the lack of the active-material layer occurs in the part where the pre-doping metal foil 9 is arranged, a short circuit due to a contact between the pre-doping metal foil 9 and the positive collector foil 21 or the negative collector foil 31 as collector foil may occur.

In contrast, in the energy storage device 100 before pre-doping, the pre-doping metal foil 9 is not arranged on the whole outer periphery of the active-material layer in the pre-doping-targeted electrode 30*a*. That is, the pre-doping metal foil 9 is arranged in such a manner as to avoid the part where the lack of the active-material layer may occur. In the case where the pre-doping metal foil 9 is arranged in direct contact with the surface of the active-material layer, this inhibits the lack of the active-material layer in the part where the pre-doping metal foil 9 is arranged. As a result, this can prevent the occurrence of a short circuit due to a contact between the pre-doping metal foil 9 and the collector foil. Furthermore, this can inhibit the production of the defective energy storage device 100, which has a lacking part of the active-material layer between the pre-doping metal foil 9 and the collector foil, and thus can reduce production cost.

In the energy storage device 100 before pre-doping, the non-arrangement part 33 is formed throughout the whole outer periphery of the positive active-material layer 22 or the negative active-material layer 32 as the active-material layer, in the pre-doping-targeted electrode 30*a*. This can still more easily avoid the lack of the active-material layer in the part where the pre-doping metal foil 9 is arranged.

In the energy storage device 100 before pre-doping, the projection area of the pre-doping metal foil 9 relative to the whole part where the active-material layer is arranged is equal to or greater than 80% and less than 100% when viewed from the stacked direction of the positive electrodes 2 and the negative electrodes 3 (negative electrode materials 30), in the pre-doping-targeted electrode 30*a*.

The positive collector foil 21 and the negative collector foil 31 as the collector foil each have a plurality of holes. This shortens time required for the pre-doping in the part, of the negative active-material layer 32, that is arranged at the position overlapping with the pre-doping metal foil 9 when viewed from the stacked direction of the positive electrodes 2 and the negative electrodes 3 (negative electrode materials 30) in comparison with the part that is arranged at the position that does not overlap with the pre-doping metal foil 9. Therefore, the projection area of the pre-doping metal foil 9 relative to the whole part where the active-material layer is arranged is set to equal to or greater than 80%, so that the active-material layer is arranged at the position widely overlapping with the pre-doping metal foil 9 when viewed from the stacked direction of the positive electrodes 2 and the negative electrodes 3. This can reduce time required for the pre-doping.

In contrast, when viewed from the stacked direction of the positive electrodes 2 and the negative electrodes 3, the projection area of the pre-doping metal foil 9 relative to the whole part where the active-material layer is arranged is less than 100% and the non-arrangement part is formed in the outer periphery of the active-material layer.

This can inhibit the occurrence of a lacking part of the active-material layer between the pre-doping metal foil 9 and the collector foil in the case of lack of the outer periphery of the active-material layer.

According to the embodiment, the method for producing the finished energy storage device 1 is a method for producing the energy storage device 100, which includes: the positive electrodes 2 and the negative electrodes 3, which are stacked alternately; the separators 4, which are interposed between each of the positive electrodes 2 and each of the negative electrodes 3; the cover 5, which contains the positive electrodes 2, the negative electrodes 3, and the separators 4; the electrolyte solution 8, which is arranged inside the cover 5; the positive terminal 6, which is coupled to the positive electrodes 2 and a part of which is arranged outside the cover 5; and the negative terminal 7, which is coupled to the negative electrodes 3 and a part of which is arranged outside the cover 5. Each of the positive electrodes 2 includes the positive collector foil 21 as collector foil having holes and the positive active-material layer 22 as an active-material layer arranged on at least one side of the collector foil, and each of the negative electrodes 3 includes the negative collector foil 31 as collector foil having holes and the negative active-material layer 32 as an active-material layer arranged on at least one side of the collector foil.

In addition, the method for producing the finished energy storage device 1 includes the forming (S2), which forms the pre-doping-targeted electrode 30*a*, in which the pre-doping metal foil 9 is arranged in direct contact with the surface of the active-material layer and the non-arrangement part 33, in which the pre-doping metal foil 9 is not arranged, is formed in at least part of the outer periphery of the active-material layer, in at least one of the positive electrodes 2 or at least one of the negative electrodes 3 (negative electrode materials 30); the stacking (S3), which stacks the pre-doping-targeted electrode 30*a*, the positive electrodes 2, the negative electrodes 3, and the separators 4, to couple the positive terminal 6 to the positive electrodes 2 and couple the negative terminal 7 to the negative electrodes 3; the containing (S4), which contains the stacked pre-doping-targeted electrode 30*a*, positive electrodes 2, negative electrodes 3, and separators 4 in the cover 5; and the pre-doping (S5), which injects the electrolyte solution 8 into the cover 5 to pre-dope lithium ions into the negative electrodes 3 with the pre-doping metal foil 9.

In the method for producing the finished energy storage device 1, the pre-doping metal foil 9 is arranged in direct contact with the surface of the positive active-material layer 22 or the negative active-material layer 32 as the active-material layer of the positive electrode 2 or the negative electrode 3 (negative electrode material 30), in the pre-doping-targeted electrode 30*a*. This can eliminate the need for a collector used in arranging the pre-doping metal foil 9 in the related art and thus can reduce parts cost.

In the pre-doping-targeted electrode 30*a*, the non-arrangement area 33, in which the pre-doping metal foil 9 is not arranged, is formed in at least part of the outer periphery of the active-material layer. That is, the pre-doping metal foil 9 is arranged in such a manner as to avoid the part where the lack of the active-material layer may occur. This inhibits the lack of the active-material layer in the part where the pre-doping metal foil 9 is arranged in the case where the pre-doping metal foil 9 is arranged in direct contact with the surface of the active-material layer. As a result, this can prevent the occurrence of a short circuit due to a contact between the pre-doping metal foil 9 and the positive collector foil 21 or the negative collector foil 31 as collector foil. Furthermore, this can inhibit the production of the defective energy storage device 1, which has a lacking part of the active-material layer between the pre-doping metal foil 9 and the collector foil, and thus can reduce production cost.

In the method for producing the finished energy storage device 1, the forming (S2) includes: the arranging (S21), which arranges the pre-doping metal foil 9 in direct contact with the surface of the positive active-material layer 22 or the negative active-material layer 32 as the active-material layer, in at least one of the positive electrodes 2 or at least one of the negative electrodes 3; and the crimping (S22), which crimps the pre-doping metal foil 9, which is arranged in the arranging (S21). In the pre-doping-targeted electrode 30a, the non-arrangement area 33 is formed in at least part of the outer periphery of the active-material layer in the state where the pre-doping metal foil 9 is crimped in the crimping (S22).

In the method for producing the finished energy storage device 1, the non-arrangement area 33 is formed in at least part of the outer periphery of the active-material layer in the state where the pre-doping metal foil 9 is crimped. This can still more easily avoid the lack of the active-material layer in the part where the pre-doping metal foil 9 is arranged.

What is claimed is:

1. A method for producing an energy storage device, wherein
    the energy storage device comprises:
        a plurality of positive electrodes and a plurality of negative electrodes, the positive electrodes and the negative electrodes being stacked alternately;
        a plurality of separators interposed between each of the positive electrodes and each of the negative electrodes;
        a cover containing the positive electrodes, the negative electrodes, and the separators;
        an electrolyte solution arranged inside the cover;
        a positive terminal coupled to the positive electrodes, a part of the positive terminal being arranged outside the cover; and
        a negative terminal coupled to the negative electrodes, a part of the negative terminal being arranged outside the cover, and
    each of the positive electrodes and each of the negative electrodes comprise collector foil having a hole and an active-material layer arranged on at least one side of the collector foil,
    the method comprising:
        forming a pre-doping-targeted electrode in which pre-doping metal foil is arranged in direct contact with a surface of the active-material layer and a non-arrangement part in which the pre-doping metal foil is not arranged is formed in at least part of an outer periphery of the active-material layer, in at least one of the positive electrodes or at least one of the negative electrodes;
        stacking the pre-doping-targeted electrode, the positive electrodes, the negative electrodes, and the separators to couple the positive terminal to the positive electrodes and couple the negative terminal to the negative electrodes;
        containing the stacked pre-doping-targeted electrode, positive electrodes, negative electrodes, and separators in the cover; and
        injecting the electrolyte solution into the cover to pre-dope lithium ions into the negative electrodes with the pre-doping metal foil.

2. The method according to claim 1, wherein
    the forming comprises:
        arranging the pre-doping metal foil in direct contact with the surface of the active-material layer, in at least one of the positive electrodes or at least one of the negative electrodes; and
        crimping the pre-doping metal foil arranged in the arranging, and
    in the pre-doping-targeted electrode, the non-arrangement part is formed in at least part of the outer periphery of the active-material layer, in a state where the pre-doping metal foil is crimped in the crimping.

* * * * *